(12) United States Patent
Kamiko

(10) Patent No.: US 10,128,776 B2
(45) Date of Patent: Nov. 13, 2018

(54) INVERTER DEVICE

(71) Applicant: Mitsubishi Electric Corporation, Tokyo (JP)

(72) Inventor: Hiroyuki Kamiko, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 41 days.

(21) Appl. No.: 15/516,097

(22) PCT Filed: Jul. 11, 2016

(86) PCT No.: PCT/JP2016/070454
§ 371 (c)(1),
(2) Date: Mar. 31, 2017

(87) PCT Pub. No.: WO2018/011863
PCT Pub. Date: Jan. 18, 2018

(65) Prior Publication Data
US 2018/0234030 A1      Aug. 16, 2018

(51) Int. Cl.
*H02M 7/5395* (2006.01)
*H02M 7/537* (2006.01)
(Continued)

(52) U.S. Cl.
CPC .......... *H02M 7/5395* (2013.01); *H02P 23/20* (2016.02); *H02P 27/06* (2013.01); *H02M 2001/0009* (2013.01)

(58) Field of Classification Search
CPC .. H02M 3/325; H02M 3/335; H02M 3/33507; H02M 3/33553; H02M 3/3155;
(Continued)

(56) References Cited

U.S. PATENT DOCUMENTS 5,742,493 A * 4/1998 Ito ..................... B60L 3/0023
                                                  363/37
6,236,172 B1 * 5/2001 Obara ................... B60L 3/00
                                                  318/139
(Continued)

FOREIGN PATENT DOCUMENTS

JP     60-124290 U    8/1985
JP     60-219999 A   11/1985
(Continued)

OTHER PUBLICATIONS

International Search Report for PCT/JP2016/070454 dated Sep. 13, 2016 [PCT/ISA/210].
(Continued)

*Primary Examiner* — Adolf Berhane
(74) *Attorney, Agent, or Firm* — Sughrue Mion, PLLC; Richard C. Turner

(57) ABSTRACT

An inverter device includes a converter circuit unit, an inverter circuit unit, and a current detector. The inverter device includes a calculator that calculates a frequency command value based on output current detected by the current detector, and a pulse signal output unit that outputs a pulse signal based on the frequency command value calculated by the calculator. The calculator includes a calculator and a calculator. The calculator estimates a target frequency from a load torque and motor characteristics, and calculates a first frequency command value with the estimated target frequency as a target. The calculator calculates a second frequency command value to cause torque current detected based on the output current detected by the current detector to follow a torque current limit value calculated based on the output current. When a deviation of the first frequency command value from the target frequency becomes less than or equal to a determination value, output (Continued)

to the pulse signal output unit is switched from the first frequency command value to the second frequency command value.

6 Claims, 7 Drawing Sheets

(51) Int. Cl.
*H02P 27/06* (2006.01)
*H02P 23/20* (2016.01)
*H02M 1/00* (2006.01)

(58) Field of Classification Search
CPC .. H02M 2001/0009; H02M 1/12; H02M 1/32; H02M 5/27; H02M 5/273; H02M 5/297; H02M 7/42; H02M 7/44; H02M 7/537; H02M 7/5395
USPC ....... 363/16, 21.1, 21.18, 34, 37, 40, 41, 55, 363/56.01, 95, 97, 131, 165
See application file for complete search history.

(56) References Cited

U.S. PATENT DOCUMENTS

| | | | |
|---|---|---|---|
| 2002/0093391 A1* | 7/2002 | Ishida | H02M 7/53871 |
| | | | 332/109 |
| 2004/0108824 A1* | 6/2004 | Ueda | H02P 25/032 |
| | | | 318/114 |
| 2017/0237376 A1* | 8/2017 | Saeki | H02P 21/34 |
| | | | 318/799 |
| 2017/0331391 A1* | 11/2017 | Ichikawa | H02P 27/06 |

FOREIGN PATENT DOCUMENTS

| | | |
|---|---|---|
| JP | 10-191689 A | 7/1998 |
| JP | 2002-46985 A | 2/2002 |
| JP | 2006-333577 A | 12/2006 |

OTHER PUBLICATIONS

Translation of International Search Report dated Sep. 13, 2016, issued by the International Searching Authority in corresponding application No. PCT/JP2016/070454 (original document submitted on Mar. 31, 2017).

* cited by examiner

INVERTER DEVICE

CROSS REFERENCE TO RELATED APPLICATIONS

This application is a National Stage of International Application No. PCT/JP2016/070454, filed on Jul. 11, 2016, the contents of all of which are incorporated herein by reference in their entirety.

FIELD

The present invention relates to an inverter device that converts DC voltage to AC voltage.

BACKGROUND

Inverter devices adjust voltage and frequency, thereby controlling the ascent and descent speed of elevators, cranes, multistory parking garages, printing machines, and others.

Patent Literature 1 discloses an inverter device that prevents an induction motor for winding and rewinding a winch cable from going into an excessive torque state. The inverter device in Patent Literature 1 has an inverter main circuit controlled by PI control. When torque current detected by a torque current detection circuit exceeds a set level, causing the excessive torque state, the frequency and voltage of AC voltage generated by an inverter are determined, based on the speed of the induction motor output from a speed detector.

CITATION LIST

Patent Literature

Patent Literature 1: JP H10-191689 A

SUMMARY

Technical Problem

The inverter device in Patent Literature 1 switches between the PI control and control to determine the frequency based on the speed of the induction motor, and thus can have difficulties in causing output frequency to adequately follow frequency command values.

The present invention has been made in view of the above, and has an object of providing an inverter device capable of adjustment to a frequency corresponding to the magnitude of a load even when load changes occur.

Solution to Problem

In order to solve the above problem to achieve the object, according to an aspect of the present invention, there is provided an inverter device including: a converter circuit unit that converts AC voltage into DC voltage, an inverter circuit unit that converts the DC voltage converted by the converter circuit unit into AC voltage, and supplies the converted AC voltage to a load; a current detector that detects output current of the inverter circuit unit; a calculator that calculates a frequency command value, based on the output current detected by the current detector; and a pulse signal output unit that outputs a pulse signal, based on the frequency command value calculated by the calculator. The calculator includes a first calculator and a second calculator. The first calculator estimates a target frequency corresponding to the magnitude of a load, and calculates a first frequency command value with the estimated target frequency as a target. The second calculator calculates a second frequency command value to cause torque current detected based on the output current detected by the current detector to follow a torque current limit value calculated based on the output current. When a deviation of the first frequency command value from the target frequency becomes less than or equal to a determination value, output to the pulse signal output unit is switched from the first frequency command value to the second frequency command value.

Advantageous Effects of Invention

The present invention achieves an effect of enabling adjustment to a frequency corresponding to the magnitude of a load even when load changes occur.

DESCRIPTION OF EMBODIMENTS

Hereinafter, an inverter device according to an embodiment of the present invention will be described in detail with reference to the drawings. The embodiment below is not intended to limit the present invention.

Embodiment

Figure 1:
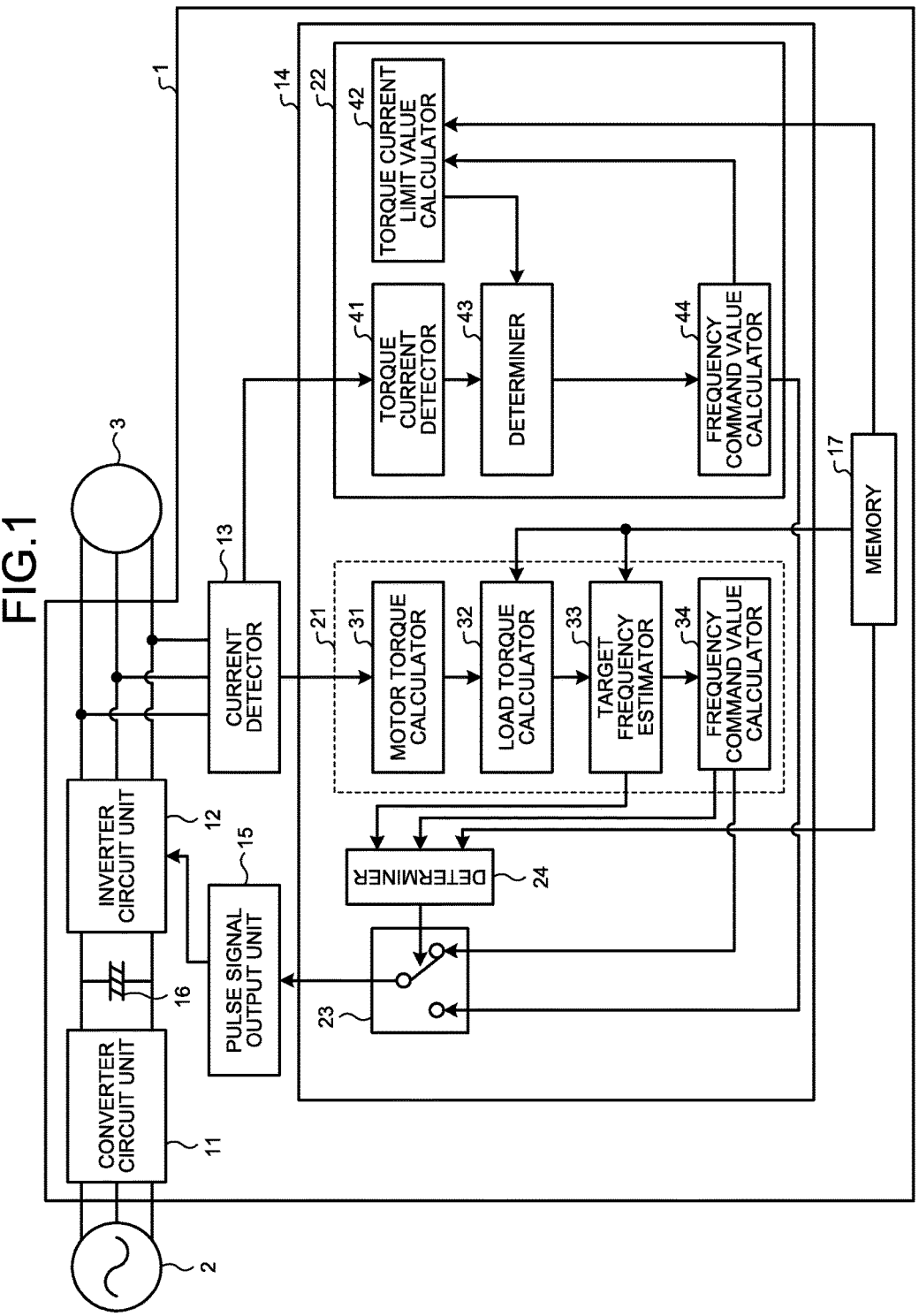
FIG. 1 is a configuration diagram of an inverter device according to an embodiment.
Figure 2:
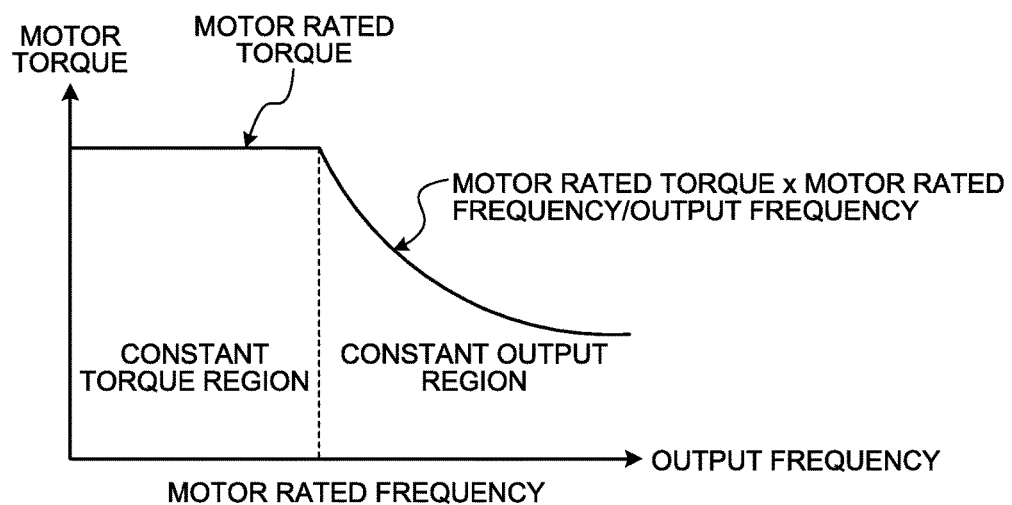
FIG. 2 is a graph for explaining a procedure of estimating a target frequency by a target frequency estimator according to the embodiment.
Figure 3:
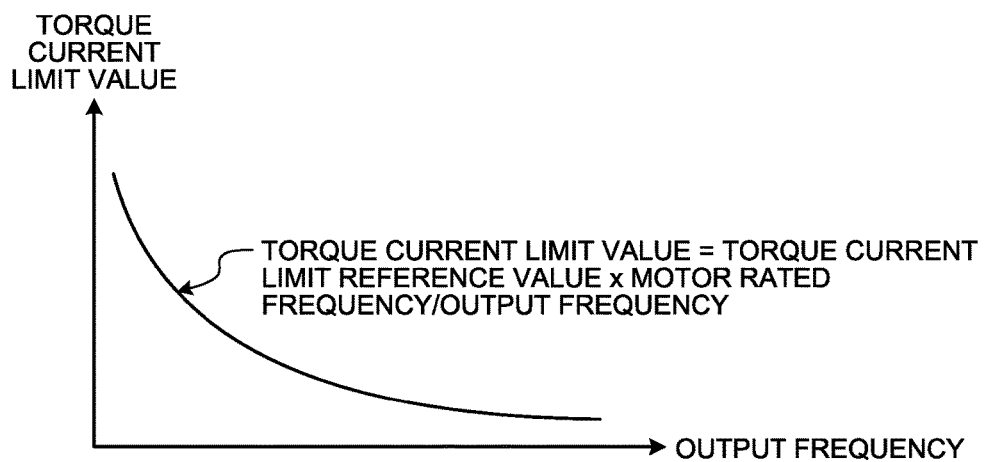
FIG. 3 is a graph illustrating the relationship between torque current limit value and output frequency according to the embodiment.

FIG. 1 is a diagram illustrating the configuration of an inverter device 1 according to the present embodiment. FIG. 2 is a graph for explaining a procedure of estimating a target frequency by a target frequency estimator according to the present embodiment. FIG. 3 is a graph illustrating the relationship between torque current limit value and the frequency of output voltage (hereinafter referred to as an "output frequency") output by an inverter circuit unit 12 according to the present embodiment.

The inverter device 1 converts AC voltage output from an AC power source 2 into DC voltage, converts the converted DC voltage into AC voltage again, and applies the converted AC voltage to a motor 3. The motor 3 is used for the ascent and descent of a motor-equipped apparatus such as an elevator, a crane, a multistory parking garage, or a printing machine. The inverter device 1 includes a converter circuit unit 11 that converts AC voltage into DC voltage, the inverter circuit unit 12 that converts DC voltage into AC voltage, a current detector 13 that detects the output current of the inverter circuit unit 12, a calculator 14 that calculates frequency command values, and a pulse signal output unit 15 that outputs pulse signals.

A smoothing capacitor 16 that smoothes DC voltage converted by the converter circuit unit 11 is interposed between the converter circuit unit 11 and the inverter circuit unit 12. The inverter device 1 has memory 17. The memory 17, the details of which will be described below, retains a torque current limit reference value, a motor rated frequency, the rated frequency of the motor 3, a motor rated torque, the rated torque of the motor 3, an inertia value of the entire apparatus, the inertia value of the apparatus using the motor 3, and an estimated error correction term for correcting estimated errors in frequency.

The inverter circuit unit 12 converts DC voltage converted by the converter circuit unit 11 into AC voltage of a frequency corresponding to the motor 3, a load, based on a pulse signal output unit from the pulse signal output unit 15, and applies the converted AC voltage to the motor 3. Specifically, the inverter circuit unit 12 controls the frequency and applied voltage of AC voltage by variable voltage variable frequency (VVVF) control.

The current detector 13 detects phase currents of a U phase, a V phase, and a W phase output from the inverter circuit unit 12. The phase currents are collectively referred to as output current.

The calculator 14 generates a frequency command value, based on the output current detected by the current detector 13. The detailed configuration of the calculator 14 will be described below.

The pulse signal output unit 15 outputs a pulse signal to the inverter circuit unit 12, based on a frequency command value generated by the calculator 14. The pulse signal is a signal that has been subjected to pulse width modulation (PWM).

Here, the configuration of the calculator 14 will be described. The calculator 14 includes a calculator 21, a first calculator, which calculates a motor torque, calculates a load torque, estimates a target frequency, and generates a frequency command value according to the target frequency, a calculator 22, a second calculator, which detects torque current, calculates a torque current limit value, determines whether to suspend the acceleration of the load or resume the acceleration of the load, and generates a frequency command value based on the result of the determination, a switch 23 that switches output to the pulse signal output unit 15 from the calculator 21 to the calculator 22, based on the frequency command value, and a determiner 24, a first determiner, which determines the timing of switching output to the pulse signal output unit 15 from the calculator 21 to the calculator 22.

Next, the configuration of the calculator 21 will be described. The calculator 21 includes a motor torque calculator 31 that calculates a motor torque, a load torque calculator 32 that calculates a load torque, a target frequency estimator 33 that estimates a target frequency, and a frequency command value calculator 34 that generates a frequency command value for reaching the estimated target frequency.

The motor torque calculator 31 calculates the motor torque, based on the output current detected by the current detector 13 during constant acceleration. Here, an example of a formula for computation of the motor toque is like the following formula (1):

[Formula 1]

$$\text{Motor torque} = \frac{i1q \times \Phi 2}{i1q(100\%) \times \Phi 2(100\%)} \times \text{motor rated torque} \quad (1)$$

$i1q$: torque current (feedback)
$\Phi 2$: magnetic flux (feedback)
$i1q(100\%)$: rated torque current
$\Phi 2(100\%)$: rated magnetic flux The formula (1) is an example of a formula for computation used in a control system using a vector control method. The vector control method is a method of controlling both exciting current and torque current independently. In the formula (1), i1q represents torque current fed back to the control system, and $\Phi 2$ represents magnetic flux fed back to the control system. i1q(100%) represents rated current, and $\Phi 2$(100%) represents rated magnetic flux. The torque current can be determined by performing dq coordinate transformation on the output current detected by the current detector 13.

Exciting current does not appear in the formula (1). When exciting current is controlled, the following formula (2) can be used.

[Formula 2]

$$\text{Motor torque} = \frac{\phi f \times i1q + P/2 \times (Ld - Lq) \times i1d \times i1q}{9.8 \times 974 \times \text{motor capacity/rated speed}} \times \text{motor rated torque} \quad (2)$$

$i1q$: torque current (feedback)
$i1d$: exciting current (feedback)
$Ld, Lq$: motor constants
$\phi f$: induced voltage constant
$P$: motor pole number In the formula (2), i1q represents torque current fed back to the control system, and i1d represents exciting current fed back to the control system. Ld and Lq represent motor constants, φf an induced voltage constant, and P the number of poles of the motor.

The load torque calculator 32 calculates the load torque, using the motor torque calculated by the motor torque calculator 31, the inertia value of the apparatus equipped with the motor 3 read from the memory 17, and acceleration during constant acceleration, which are substituted into the following formula (3):

Load torque=motor torque−(inertia value of entire apparatus×acceleration during constant acceleration) (3)

Here, as is clear from the formula (3), the load torque is a torque required for maintaining the load even when the acceleration is zero. The load torque depends on the magnitude of the load.

The target frequency estimator 33 estimates a target frequency, using the load torque calculated by the load torque calculator 32 and motor torque characteristics based on the motor rated frequency and the motor rated torque read from the memory 17. Here, the target frequency is a frequency estimated using the formula (3) by the calculator 21 based on the load torque and the motor torque characteristics in the early stages of drive start.

The frequency command value calculator 34 outputs a frequency command value calculated based on the estimated target frequency to the switch 23.

FIG. 2 illustrates typical motor torque characteristics. As illustrated in FIG. 2, the motor torque in a constant output region has an inversely proportional relationship with the output frequency. This relationship can be expressed by the following formula (4):

Motor torque in constant output region=motor rated torque×motor rated frequency/output frequency (4)

Here, the motor torque under a constant speed corresponds to that when the acceleration is zero in the formula (3). Thus, motor torque under constant speed=load torque. Therefore, the target frequency can be determined by the following formula (5):

Target frequency=motor rated torque×motor rated frequency/load torque (5)

Next, the configuration of the calculator 22 will be described. The calculator 22 includes a torque current detector 41 that detects torque current, a torque current limit value calculator 42 that calculates a torque current limit value, a determiner 43, a second determiner, which determines whether to suspend the acceleration of the load or resume the acceleration of the load, and a frequency command value calculator 44 that calculates a frequency command value.

The torque current detector 41 detects torque current, based on the output current detected by the current detector 13. Specifically, the torque current detector 41 detects torque current by performing dq coordinate transformation, based on the output current detected by the current detector 13.

The torque current limit value calculator 42 calculates the torque current limit value. FIG. 3 illustrates the characteristics of the torque current limit value with respect to the output frequency. As illustrated in FIG. 3, the torque current limit value has an inversely proportional relationship with the output frequency. This relationship can be expressed by the following formula (6):

Torque current limit value=torque current limit reference value×motor rated frequency/output frequency (6)

The torque current limit value calculator 42 substitutes the torque current limit reference value and the motor rated frequency read from the memory 17, and the frequency command value input from the frequency command value calculator 44 into the formula (6) to calculate the torque current limit value. The torque current limit value is a value decreasing with reductions in the magnetic flux of the motor 3.

The determiner 43 determines whether to suspend the acceleration of the load or resume the acceleration of the load, based on the torque current and the torque current limit value. Specifically, when the torque current is more than or equal to the torque current limit value, the determiner 43 outputs a signal to suspend acceleration to the frequency command value calculator 44. When the torque current is less than the torque current limit value, the determiner 43 outputs a signal to resume acceleration to the frequency command value calculator 44.

The frequency command value calculator 44 calculates the frequency command value, based on the result of determination of the determiner 43. Specifically, when the frequency command value calculator 44 receives a signal to suspend acceleration, it maintains the previous frequency command value. When the frequency command value calculator 44 receives a signal to resume acceleration, it increases the frequency command value. The frequency command value calculator 44 outputs the calculated frequency command value to the pulse signal output unit 15.

The switch 23 switches the frequency command value to be output to the pulse signal output unit 15 from the frequency command value calculated by the calculator 21 to the frequency command value calculated by the calculator 22, based on the target frequency output from the target frequency estimator 33 and the frequency command value output from the frequency command value calculator 34.

Figure 4:
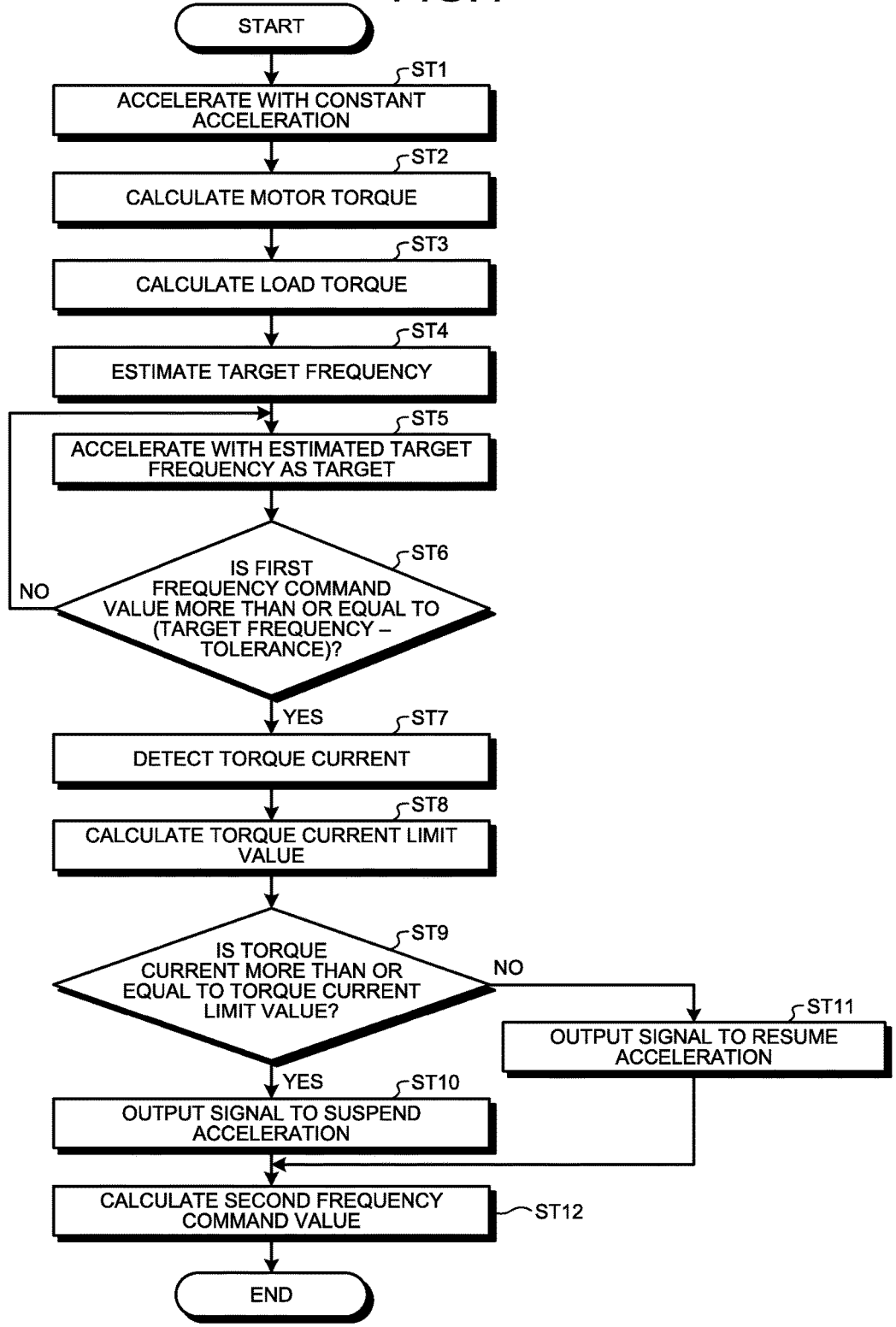
FIG. 4 is a flowchart for explaining an operation of a calculator according to the embodiment.

Next, the flow of a series of processing in the calculator 14 including switching of the frequency command value will be described with reference to the flowchart illustrated in FIG. 4. FIG. 4 is a flowchart for explaining an operation of the calculator 14 according to the present embodiment. When the frequency command value calculated by the frequency command value calculator 34 of the calculator 21 is distinguished from the frequency command value calculated by the frequency command value calculator 44 of the calculator 22 only by words, the frequency command value calculated by the frequency command value calculator 34 of the calculator 21 is referred to as a "first frequency command value," and the frequency command value calculated by the frequency command value calculator 44 of the calculator 22 is referred to as a "second frequency command value."

First, in step ST1, the calculator 14 outputs the frequency command value at constant acceleration to the pulse signal output unit 15. At this time, current flows through the motor 3, and the motor 3 accelerates with constant acceleration.

In step ST2, the motor torque calculator 31 calculates the motor torque, based on the output current detected by the current detector 13 during constant acceleration.

In step ST3, the load torque calculator 32 calculates the load torque, based on the motor torque calculated by the motor torque calculator 31.

In step ST4, the target frequency estimator 33 estimates the target frequency, based on the load torque calculated by the load torque calculator 32.

In step ST5, the frequency command value calculator 34 outputs the first frequency command value increased at a constant rate at regular time intervals with the target frequency estimated by the target frequency estimator 33 as a target, to the pulse signal output unit 15 via the switch 23. Thus, the motor 3 accelerates with the target frequency as a target.

In step ST6, the determiner 24 compares the first frequency command value with the target frequency. When the first frequency command value is less than the "value of the target frequency from which a tolerance is subtracted" (step ST6, No), the processing in step ST5 is continued. The processing in steps ST5 and ST6 describes the state where the output of the calculator 21 is output to the pulse signal output unit 15 via the switch 23.

On the other hand, in the determiner 24, when the first frequency command value is more than or equal to the "value of the target frequency from which the tolerance is subtracted" in step ST6 (step ST6, Yes), the process proceeds to processing in step ST7, and processing from step ST7 to step ST12 is performed. The processing in step ST7 to step ST12 describes the state where the output of the calculator 22 is output to the pulse signal output unit 15 via the switch 23.

In the determination processing in step ST6 above, it is determined whether the first frequency command value is more than or equal to the "value of the target frequency from which the tolerance is subtracted" or not. This is equivalent to the determination of whether the deviation of the first frequency command value from the target frequency is less than or equal to the tolerance or not. In this case, when the deviation of the first frequency command value from the target frequency exceeds the tolerance, the processing in step ST5 is continued. When the deviation of the first frequency command value from the target frequency is less than or equal to the tolerance, the process proceeds to the processing in step ST7, and processing from step ST7 to step ST12 is performed.

When the first frequency command value is equal to the "value of the target frequency from which the tolerance is subtracted" in the determination processing in step ST6 above, the processing in step ST7 is performed. Alternatively, the processing in step ST5 may be performed. That is, the determination of whether the first frequency command value is equal to the "value of the target frequency from which the tolerance is subtracted" or not may lead to the determination of either "Yes" or "No."

In the processing in step ST6, the tolerance used in determination corresponds to the estimated error correction term retained in the memory 17. The estimated error correction term aims at correcting estimated errors in the frequency corresponding to the magnitude of the load, and can be determined considering the environment in which the apparatus is placed or detection accuracy.

The processing from step ST7 to step ST12 is processing in the calculator 22. First, in step ST7, the torque current detector 41 detects the torque current, based on the output current detected by the current detector 13.

In step ST8, the torque current limit value calculator 42 calculates the torque current limit value, based on the torque current limit reference value, the motor rated frequency, and the second frequency command value. A formula for computation of the torque current limit value is as shown in the formula (6). The torque current limit value calculator 42 outputs the torque current limit value that changes from moment to moment to the determiner 43. Even when the output of the calculator 22, that is, the second frequency command value is not output to the pulse signal output unit 15, the calculator 22 itself operates.

In step ST9, the determiner 43 determines whether the torque current is more than or equal to the torque current limit value. When the determiner 43 determines that the torque current is more than or equal to the torque current limit value (step ST9, Yes), the process proceeds to step ST10. On the other hand, when the determiner 43 determines that the torque current is not more than or equal to the torque current limit value, that is the torque current is less than the torque current limit value (step ST9, No), the process proceeds to step ST11.

In step ST10, the determiner 43 outputs a signal to suspend acceleration to the frequency command value calculator 44.

In step ST11, the determiner 43 outputs a signal to resume acceleration to the frequency command value calculator 44.

The processing in steps ST10 and ST11 causes the torque current to change, following the torque current limit value.

In step ST12, the frequency command value calculator 44 calculates the second frequency command value, based on the result of determination by the determiner 43.

When the torque current is equal to the torque current limit value in the determination processing in step ST9 above, the processing in step ST10 is performed. Alternatively, the processing in step ST11 may be performed. That is, the determination of whether the torque current is equal to the torque current limit value or not may lead to the determination of either "Yes" or "No."

Figure 5:
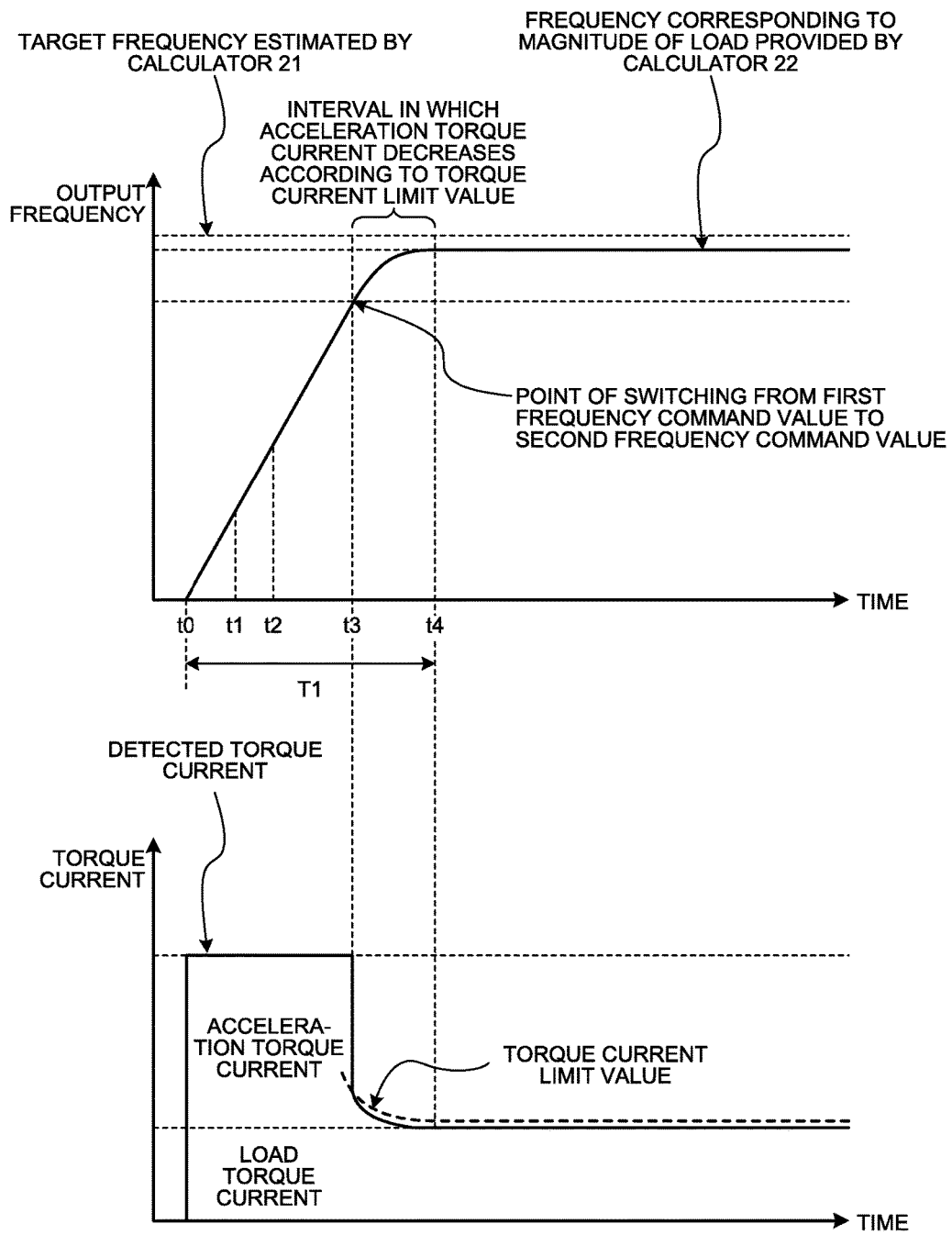
FIG. 5 is a graph for explaining the operation of the inverter device according to the embodiment.
Figure 6:
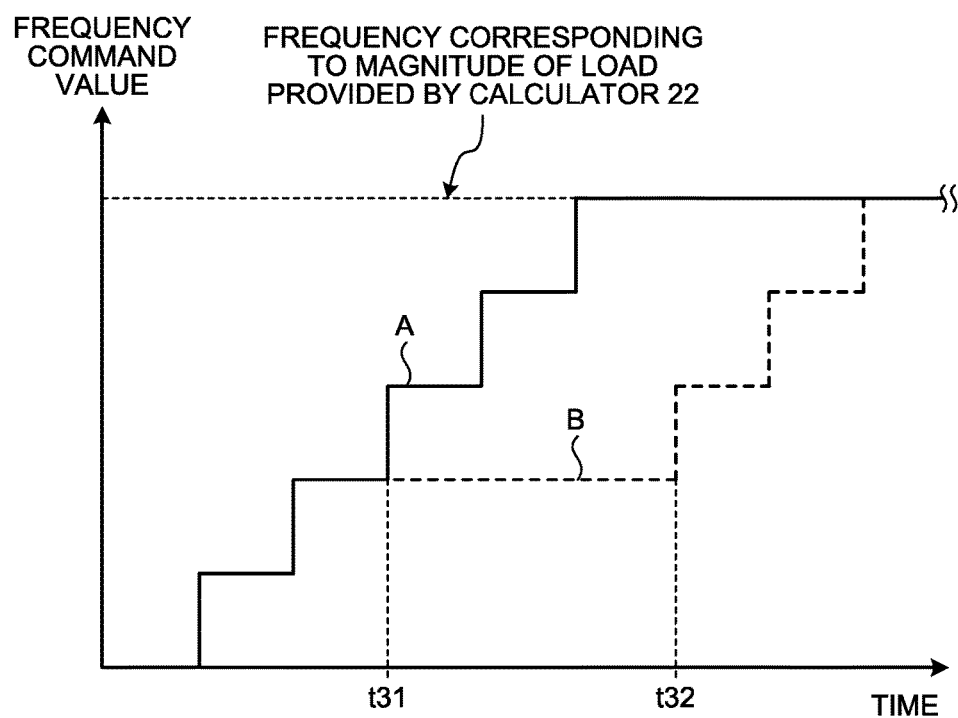
FIG. 6 is a graph for explaining the operation of the inverter device on and after switching from control by a first calculator to control by a second calculator.

Up to here, the operation inside the inverter device 1 has been described. From here, the operation of the inverter device 1 as viewed from the motor 3 will be described with reference to FIGS. 5 and 6. FIG. 5 is a graph for explaining the operation of the inverter device 1 according to the present embodiment. The upper portion in FIG. 5 illustrates changes over time in the output frequency increasing toward the target frequency. The lower portion in FIG. 5 illustrates changes over time in the torque current, the sum of load torque current and acceleration current. In the description below, as illustrated in FIG. 5, at a time t3, the switch 23 switches the frequency command value to be output to the pulse signal output unit 15 to the frequency command value provided by the calculator 22. FIG. 6 is a graph for explaining the operation of the inverter device 1 on and after switching from control by the first calculator 21 to control by the second calculator 22. In the description below, suppose that, as illustrated in FIG. 6, a signal to suspend acceleration is input at a time t31, and a signal to resume acceleration is input at a time t32.

In FIG. 5, at a time t0, acceleration is started. Acceleration with constant acceleration causes the output frequency to increase. Next, between times t1 and t2 during constant acceleration, the calculator 21 estimates the target frequency. After that, the frequency command value is generated with the target frequency as a target to continue constant acceleration. Then, at a time t3, the switch 23 switches from the frequency command value (first frequency command value) output to the pulse signal output unit 15 to the frequency command value (second frequency command value) provided by the calculator 22. The time t3 at this time means a time when the determination of "Yes" is made in the determination processing in step ST6 in the flowchart in FIG. 4.

As described above, from the time t3 on, the processing in the calculator 22 is performed. Since the processing in the calculator 22 is performed, limit processing based on the torque current limit value operates from the time t3. When the torque current becomes more than or equal to the torque current limit value, the determiner 43 suspends acceleration. As illustrated by a waveform in the lower portion in FIG. 5, the torque current decreases by the amount of acceleration torque current due to the suspension of acceleration.

When the torque current becomes less than the torque current limit value due to the decrease in the torque current, the determiner 43 resumes acceleration. The output frequency is increased by the resumption of acceleration.

The suspension or resumption of acceleration causes the torque current to change, following the torque current limit value.

FIG. 6 illustrates a manner in which acceleration is suspended and resumed. In the calculator 22, when the frequency command value calculator 44 has not received a signal from the determiner 43, and when the frequency command value calculator 44 has received a signal to resume acceleration, it outputs the frequency command value increased at a constant rate at regular time intervals to the pulse signal output unit 15 until the frequency corresponding to the magnitude of the load provided by the calculator 22 is reached, as illustrated in FIG. 6. Here, A in FIG. 6 represents changes in the frequency command value when it is increased to the frequency corresponding to the magnitude of the load without suspending acceleration. On the other hand, B in FIG. 6 represents a waveform of the frequency command value when it is increased to the frequency corresponding to the magnitude of the load by suspending and resuming acceleration. Times t31 and t32 in FIG. 6 are times located between the times t3 and t4 in FIG. 5.

When the frequency command value calculator 44 receives a signal to suspend acceleration from the determiner 43 at the time t31, it outputs the frequency command value of the same value to the pulse signal output unit 15 so as not to increase the output frequency. When the frequency command value calculator 44 receives a signal to resume acceleration from the determiner 43 at the time t32, it outputs the frequency command value increased at a constant rate to the pulse signal output unit 15 so as to increase the output frequency.

Returning to FIG. 5, when there is no acceleration torque current, and suspension of acceleration does not cause the torque current to decrease, the output frequency does not increase. That is, the frequency at which the output frequency becomes constant is the frequency corresponding to the magnitude of the load. When the output frequency reaches the frequency corresponding to the magnitude of the load, the frequency command value calculator 44 continues to output the constant frequency command value to the pulse signal output unit 15 to maintain the output frequency.

When the torque current becomes more than or equal to the torque current limit value, the inverter device 1 suspends acceleration to keep the output frequency constant, and reduces the acceleration torque to cause the torque current to decrease. When the torque current becomes less than the torque current limit value, the inverter device 1 resumes acceleration to increase the output frequency, thereby finally making the torque current equal to the torque current limit value.

Thus, even if there is an error in the target frequency estimated by the calculator 21, the inverter device 1 can precisely adjust to the frequency corresponding to the magnitude of the load by the switch 23 switching to the calculator 22. The upper portion in FIG. 5 shows by example the case where there is an error in the target frequency, illustrating a manner of convergence to a frequency that is not the target frequency. t4-t0, a time difference between a convergence time t4 and the acceleration start time t0, is a convergence time period T1. Thus, the inverter device according to the present embodiment can adjust to the output frequency corresponding to the load without being influenced by load changes during acceleration.

Accordingly, in the inverter device 1 according to the present embodiment, the output frequency of a pulse signal increases at a constant rate in a first period, the rate of increase of the output frequency decreases in a second period after the first period, and the output frequency is equal to the frequency corresponding to the magnitude of the load in a third period after the second period. Here, the first period represents a period between t0 and t3, the second period a period between t3 and t4, and the third period a period from t4 on. Being equal to the frequency corresponding to the magnitude of the load may be that the output frequency is equal to the frequency corresponding to the magnitude of the load to the extent that the inverter device 1 can control.

Figure 7:
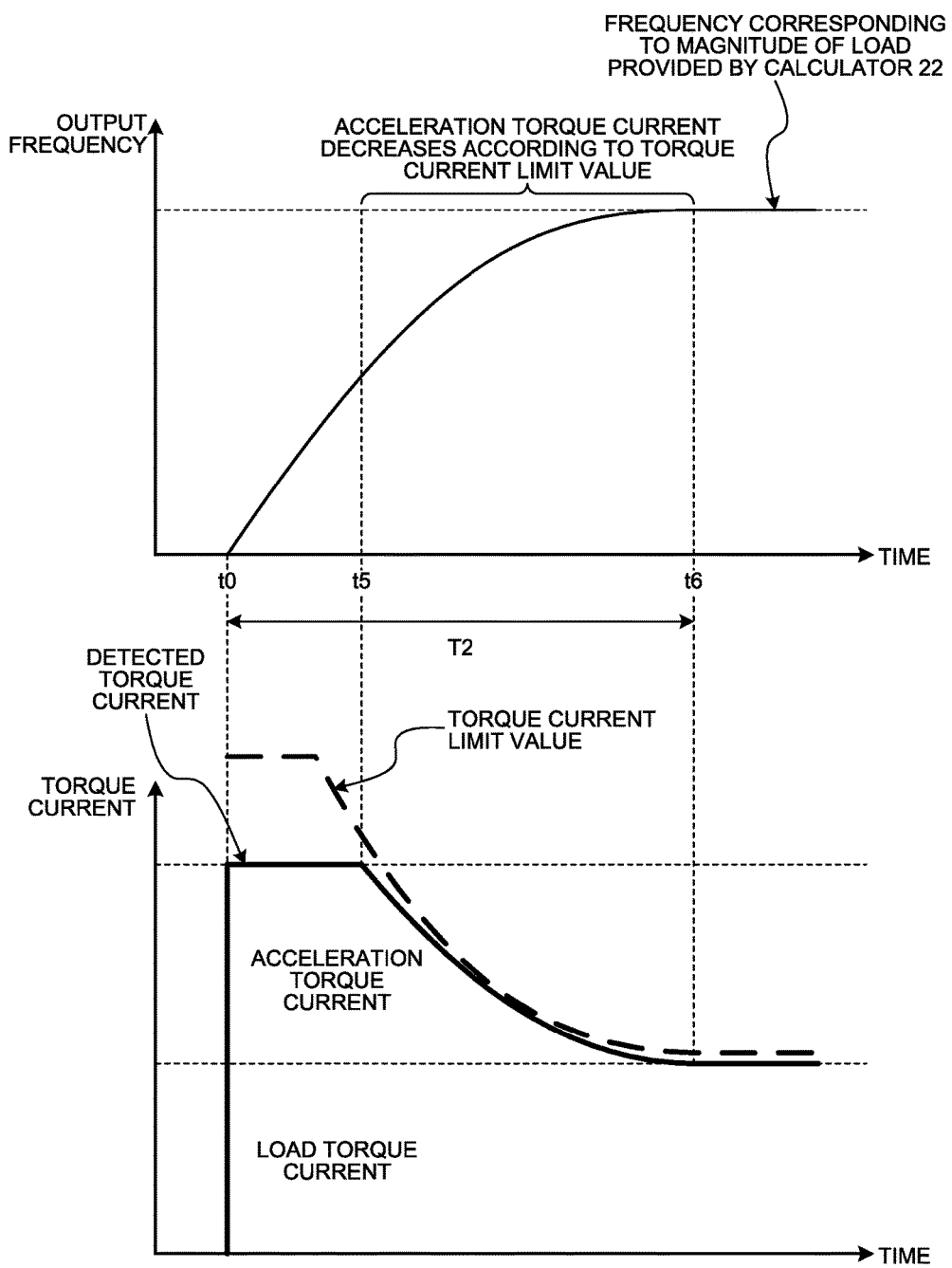
FIG. 7 is a graph illustrating output frequency and torque current when output frequency is increased using only the second calculator.

Next, effects of the combined use of the calculator 21 and the calculator 22 will be described with reference to FIGS. 5 and 7. FIG. 7 is a graph illustrating the output frequency and the torque current when the output frequency is increased using only the calculator 22. As in FIG. 5, the upper portion in FIG. 7 illustrates changes over time in the output frequency increasing to the frequency corresponding to the magnitude of the load. The lower portion in FIG. 7 illustrates changes over time in the torque current.

When the output frequency is increased using only the calculator 22, it increases to the frequency corresponding to the magnitude of the load as illustrated in the upper portion in FIG. 7. At this time, as illustrated in the lower portion in FIG. 7, the torque current is limited so as not to exceed the torque current limit value from a time t0, an acceleration start time.

As illustrated in FIG. 7, from a time t5 on, acceleration torque current decreases due to the limitation based on the torque current limit value. The upper portion in FIG. 7 illustrates a manner of convergence to the frequency corresponding to the magnitude of the load at a time t6. t6-t0, a time difference between the convergence time t6 and the acceleration start time t0, is a convergence time period T2. Here, a comparison between the convergence time period T1 when the calculator 21 and the calculator 22 are used in combination and the convergence time period T2 when only the calculator 22 is used shows that T1<T2, as is clear from a comparison between FIG. 5 and FIG. 7. That is, the combined use of the calculator 21 and the calculator 22 can shorten the time period of convergence to the target value.

Thus, in the present embodiment, the output frequency increases at a constant rate for a period to the point of switching from the first frequency command value to the second frequency command value as illustrated in FIG. 5. The output frequency may increase at a constant rate at least for an interval between t1 and t2. However, as in the comparison with FIG. 7, to shorten the time period of convergence to the target value, the output frequency desirably increases at a constant rate between a point in time when the output frequency is zero and a point of switching from the first frequency command value to the second frequency command value as in FIG. 5. That is, the first period may be at least from t1 to t2, but is desirably from t0 to t3 in terms of shortening the convergence time period.

FIG. 6 illustrates the frequency command value during the second period. As in FIG. 6, the frequency command value changes such that the torque current follows the torque current limit value, thereby continuously reducing, or gradually reducing, the rate of increase of the output frequency during the second period in FIG. 5.

In the case where, as in Patent Literature 1, frequency is determined based on the speed of an induction motor only when an excessive torque state is found, and PI control is performed in the other states, the frequency reaches a constant frequency, repeating overshoots and undershoots with respect to a command value during a PI control period, thus causing a problem that an output frequency does not adequately follow a frequency command value. On the other hand, when the present embodiment is used, the second frequency command value is calculated to cause the torque current to follow the torque current limit value, so that the output frequency follows the frequency command value, and overshoots and undershoots can be prevented.

Patent Literature 1 switches from the PI control to the control using the frequency command value determined from the detected speed when torque current exceeds a preset level, and thus is difficult to apply to the case where the frequency corresponding to the magnitude of a load exceeds a target frequency, or changes such that the torque becomes lighter. On the other hand, using the present embodiment, the device is applicable to either the case where change or error in load torque increases or the case where it decreases.

When frequency is determined based on the speed of an induction motor in an excessive torque state as in Patent Literature 1, a speed detector is required. Using the present embodiment enables application to the case where a speed detector is not used.

Figure 8:
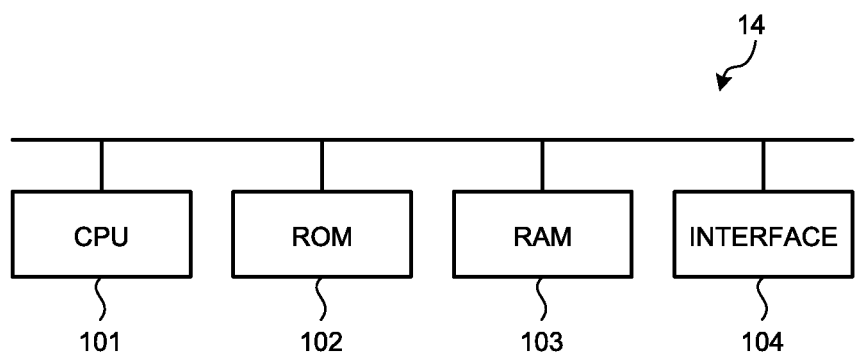
FIG. 8 is a block diagram illustrating an example of the hardware configuration of the calculator according to the embodiment.

As illustrated in FIG. 8, the calculator 14 according to the above-described present embodiment may be formed from a CPU 101 that performs operations, ROM 102 in which programs to be read by the CPU 101 are stored, RAM 103 in which the programs stored in the ROM 102 are developed, and an interface 104 that performs input and output of signals. The components of the calculator 14 are programmed and stored in the ROM 102. The interface 104 receives output signals from the current detector 13, and outputs output frequencies to the pulse signal output unit 15.

The CPU 101 reads a program stored in the ROM 102, develops the read program in the RAM 103, and performs an operation based on an output signal input from the current detector 13 and data stored in the memory 17 to calculate the above-described output frequency. The output frequency calculated by the CPU 101 is output to the pulse signal output unit 15 via the interface 104.

The configuration illustrated in the above embodiment illustrates an example of the subject matter of the present invention, and can be combined with another known art, and can be partly omitted or changed without departing from the scope of the present invention.

REFERENCE SIGNS LIST 1 inverter device, 2 AC power source, 3 motor, 11 converter circuit unit, 12 inverter circuit unit, 13 current detector, 14 calculator, 15 pulse signal output unit, 16 smoothing capacitor, 17 memory, 21 calculator (first calculator), 22 calculator (second calculator), 23 switch, 24 determiner (first determiner), 31 motor torque calculator, 32 load torque calculator, 33 target frequency estimator, 34 frequency command value calculator, 41 torque current detector, 42 torque current limit value calculator, 43 determiner (second determiner), 44 frequency command value calculator, 101 CPU, 102 ROM, 103 RAM, 104 interface.

The invention claimed is:

1. An inverter device comprising:
   an inverter circuit unit to convert DC voltage into AC voltage, and supply the converted AC voltage to a load;
   a current detector to detect output current of the inverter circuit unit;
   a calculator to calculate a frequency command value, based on the output current detected by the current detector; and
   a pulse signal output unit to output a pulse signal, based on the frequency command value calculated by the calculator, wherein
   the calculator comprises:
      a first calculator to estimate a target frequency, and calculate a first frequency command value with the estimated target frequency as a target; and
      a second calculator to calculate a second frequency command value to cause torque current detected based on the output current detected by the current detector to follow a torque current limit value calculated based on the output current, and
   when a deviation of the first frequency command value from the target frequency becomes less than or equal to a determination value, output to the pulse signal output unit is switched from the first frequency command value to the second frequency command value.

2. The inverter device according to claim 1, wherein the first calculator estimates the target frequency, based on a load torque calculated based on a motor torque.

3. The inverter device according to claim 1, wherein the second calculator determines whether to suspend acceleration of the load or resume acceleration of the load, based on the torque current and the torque current limit value, and calculates the second frequency command value based on a result of the determination.

4. An inverter device comprising:
   an inverter circuit unit to convert DC voltage into AC voltage, and supply the converted AC voltage to a load;
   a current detector to detect output current of the inverter circuit unit;
   a calculator to calculate a frequency command value based on the output current detected by the current detector; and
   an output unit to output a pulse signal to the inverter circuit unit based on the frequency command value, wherein
   an output frequency of the pulse signal increases at a constant rate in a first period, a rate of increase of the output frequency decreases in a second period after the first period, and the output frequency is equal to a frequency corresponding to a magnitude of the load in a third period after the second period.

5. The inverter device according to claim 4, wherein the rate of increase continuously decreases in the second period.

6. The inverter device according to claim 4, wherein the first period starts at a point in time when the output frequency is zero.

* * * * *